United States Patent
Bain

(10) Patent No.: US 6,705,580 B1
(45) Date of Patent: Mar. 16, 2004

(54) CUP HOLDER FOR A MOTOR VEHICLE

(75) Inventor: Mark Bain, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/325,388

(22) Filed: Dec. 20, 2002

(51) Int. Cl.⁷ .................................................. A47K 1/08
(52) U.S. Cl. ................................ 248/311.2; 248/313
(58) Field of Search .............................. 248/311.2, 312, 248/312.1, 313, 154, 149, 147

(56) References Cited

U.S. PATENT DOCUMENTS

| | | | |
|---|---|---|---|
| 2,095,878 A | 10/1937 | Kellogg | 226/129 |
| 4,708,386 A | 11/1987 | Moore et al. | 296/37.8 |
| 4,712,823 A | 12/1987 | Mills et al. | 296/37.8 |
| 4,927,108 A | 5/1990 | Blazic et al. | 248/311.2 |
| 4,981,277 A | 1/1991 | Elwell | 248/311.2 |
| 5,024,411 A | 6/1991 | Elwell | 248/311.2 |
| 5,033,709 A | 7/1991 | Yuen | 248/313 |
| 5,052,649 A | 10/1991 | Hunnicutt | 248/311.2 |
| 5,054,733 A * | 10/1991 | Shields | 248/313 |
| 5,088,673 A | 2/1992 | Chandler | 248/311.2 |
| 5,143,338 A | 9/1992 | Eberlin | 248/313 |
| 5,149,032 A | 9/1992 | Jones et al. | 248/154 |
| 5,154,380 A | 10/1992 | Risca | 248/154 |
| 5,234,251 A | 8/1993 | Ayotte | 297/194 |
| 5,289,962 A | 3/1994 | Tull et al. | 224/273 |
| 5,326,064 A | 7/1994 | Sapien | 248/311.2 |
| 5,385,325 A | 1/1995 | Rigsby | 248/313 |
| 5,398,898 A | 3/1995 | Bever | 248/154 |
| 5,494,249 A | 2/1996 | Ozark et al. | 248/311.2 |
| 5,533,700 A | 7/1996 | Porter | 248/311.2 |
| 5,639,052 A | 6/1997 | Sauve | 248/311.2 |
| 5,676,340 A | 10/1997 | Ruhnau | 248/311.2 |
| 5,782,448 A * | 7/1998 | Withun et al. | 248/311.2 |
| 5,839,711 A * | 11/1998 | Bieck et al. | 248/313 |
| 5,897,041 A | 4/1999 | Ney et al. | 224/483 |
| 5,897,089 A * | 4/1999 | Lancaster et al. | 248/311.2 |
| 5,988,579 A * | 11/1999 | Moner et al. | 248/311.2 |
| 6,070,844 A | 6/2000 | Salenbauch et al. | 248/313 |
| 6,092,775 A | 7/2000 | Gallant | 248/311.2 |

* cited by examiner

Primary Examiner—Leslie A. Braun
Assistant Examiner—A. Joseph Wujciak
(74) Attorney, Agent, or Firm—Thomas A. Jurecko

(57) ABSTRACT

A cup holder for securely retaining a container, the cup holder includes a body having a radially extending flange. A series of upwardly extending arms are attached to the flange and adapted for pivotal movement thereabout. A rotating member is interconnected to the series of arms whereby the arms inwardly extend and are configured to collectively expand and contract.

8 Claims, 3 Drawing Sheets

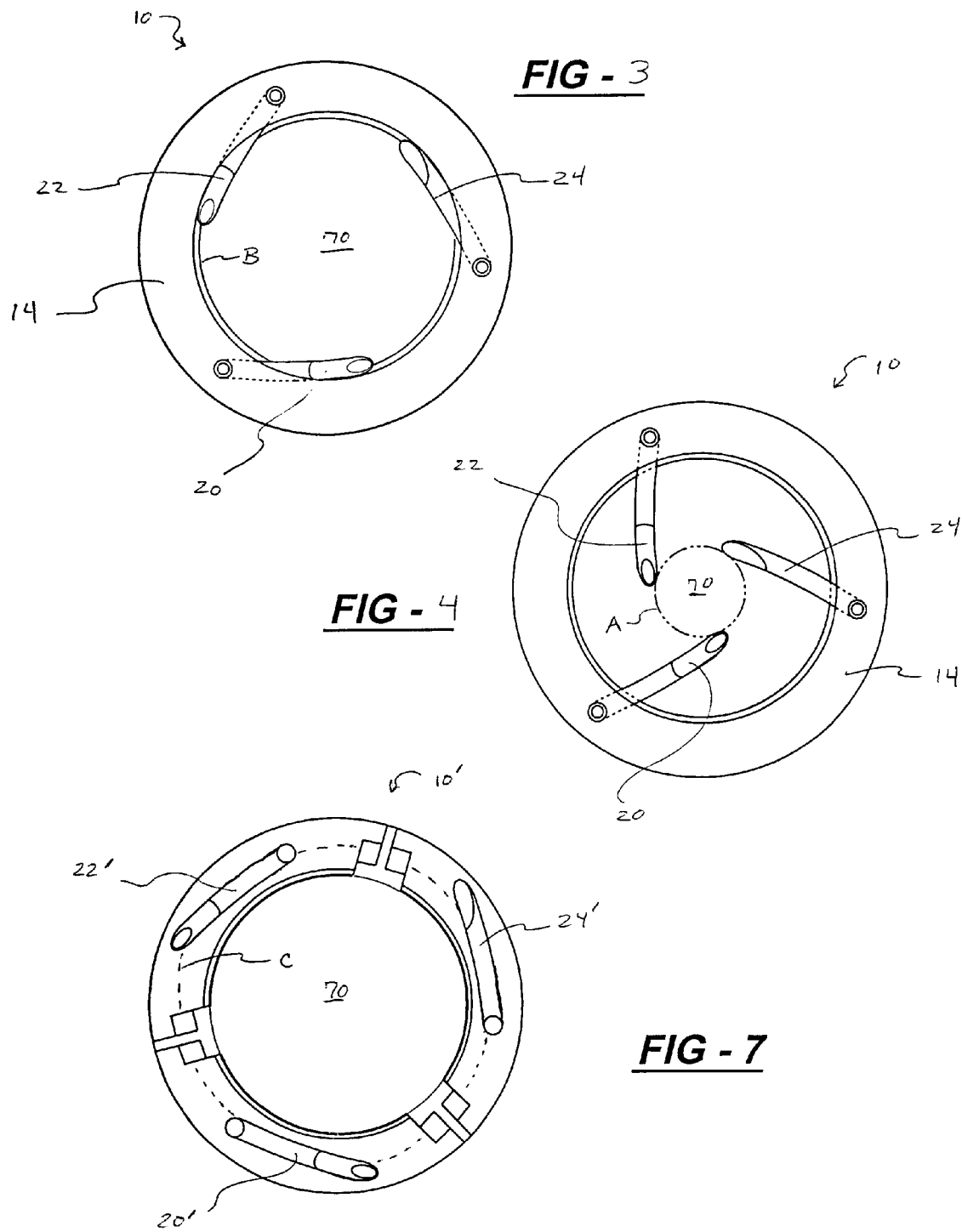

CUP HOLDER FOR A MOTOR VEHICLE

FIELD OF THE INVENTION

The present invention relates generally to cup holders, and more particularly to a cup holder having inwardly extending, radially biased retaining arms.

BACKGROUND OF THE INVENTION

Container holders are well known to be incorporated into moving vehicles and the like. The container holders are generally configured to provide an adequate aperture suitable for retaining a cup or beverage such that the contents do not spill while the vehicle is in transit.

Because beverage containers are available in many sizes having unique circumferences, adjustable beverage containers have been developed. However, existing adjustable container holders have many disadvantages. Some holders are adjustable to a set circumference to secure a given beverage but become widened during transit from the inertial forces of the beverage and vehicle. Other holders are awkward and difficult to insert a beverage with one hand.

It would be desirable to provide an adjustable container holder that can securely grasp containers having different sizes, easily adjust to the desired size and provide continuous retention desirable for a secure hold.

SUMMARY OF THE INVENTION

It is a general object of the present invention to provide a container holder having adjustable arms adaptable to retain a variety of containers having unique circumferences.

In one form, the present invention provides a container holder having a cylindrical body including a base and an open upper end, the body defining an inner space. A series of arms are pivotally connected to the body and adapted to extend into the inner space. The arms are configured to collectively expand and contract.

In another form, the present invention provides a container holder having a body including a radially extending flange. A series of upwardly extending arms are attached to the flange and adapted for pivotal movement thereabout. A rotating member is interconnected to the series of arms whereby the arms inwardly extend and are configured to collectively expand and contract.

In yet another form, the present invention provides a container holder including a body having a base. A series of arms are pivotally attached to the base and extend radially inwardly, the series of arms configured to collectively actuate inwardly and outwardly.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a plan view of the cup holder illustrating the arms in a fully expanded position.

FIG. 4 is a plan view of the cup holder illustrating the arms in a contracted position.

FIG. 7 is a plan view of the arms of the second embodiment in a fully expanded position.

DETAILED DESCRIPTION OF THE PREFERRED EMBODIMENTS

Figure 1:
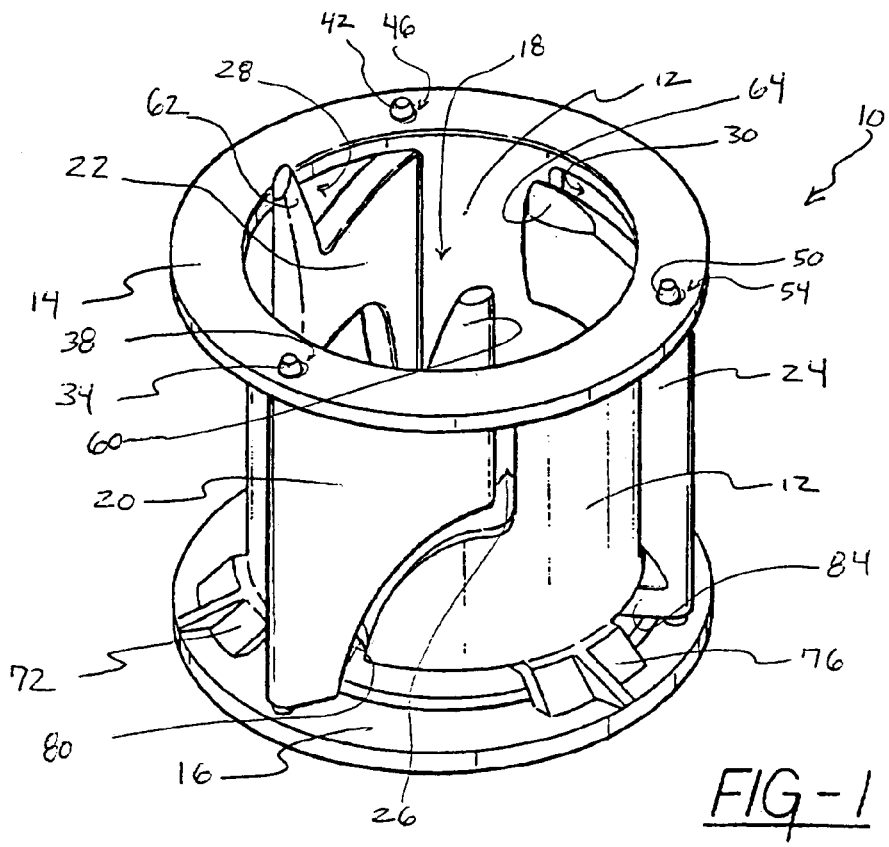
FIG. 1 is a perspective view of the cup holder according to the preferred embodiment of the present invention

With initial reference to the perspective view of FIG. 1, the container holder according to the preferred embodiment is illustrated and generally identified at reference numeral 10. Holder 10 generally includes an upwardly extending circumferential body 12 defining inner space 18 having an upper and lower outwardly extending flange portion 14, 16. Holder 10 further includes first, second and third inwardly extending arms 20, 22 and 24. Arms 20, 22 and 24 are pivotally attached to the upper and lower flange 14, 16 and extend through first, second and third aperture 26, 28 and 30 configured in the body 12.

With continued reference to FIG. 1 and further reference to FIGS. 2 and 3, the structure and operation of the container holder 10 will be described in greater detail. First arm 20 includes an upper and lower pivot post 34, 36 which are adapted to extend through and rotate about first upper aperture and first lower aperture 38, 40 in upper and lower flange 14, 16 respectively. Similarly, second arm 22 includes an upper and lower pivot post 42, 44 which are adapted to extend through and rotate about second upper aperture and second lower aperture 46, 48 respectively. Likewise, third arm 24 includes upper and lower pivot post 50, 52 which extend through and rotate about third upper aperture and third lower aperture 54, 56 respectively.

First and second arm 20, 22 include upwardly extending fingers 60, 62. Fingers 60, 62 are generally contoured outwardly to facilitate entrance of a container into the holder 10. In addition, third arm 24 includes an entrance notch 64 incorporated thereon. The entrance notch 64 further improves ease of accessibility to the inner space 18 of the body 10. Explained further, a container may be placed on the portion of the upper flange aligned with the entrance notch 64 of the third arm 24 and be slid inwardly toward the first and second fingers 60, 62 of the first and second arm 20, 22 until engagement therewith whereby the container may be directed toward the inner space 18 until resting upon the stationary platform 70.

Figure 2:
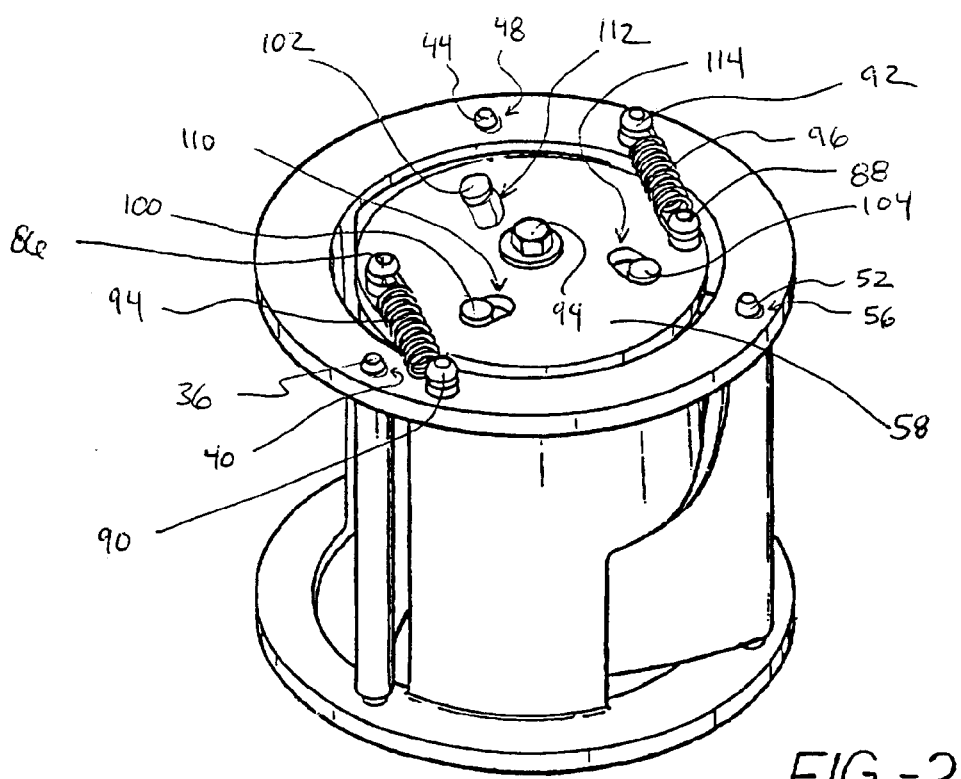
FIG. 2 is a perspective view of the cup holder rotated upon a horizontal axis 180 degrees to illustrate the biased rotatable disk.

With continued reference to FIGS. 1, 2 and 3, body 12 includes first, second and third step sections 72, 74 and 76 radially disposed therearound. The step sections 72, 74 and 76 operatively connect stationary platform 70 to body 12. First second and third arms 20, 22 and 24 include first second and third feet 80, 82 and 84 extending inwardly between stationary platform 70 and rotating disk 58. Guide posts 100, 102 and 104 extend substantially perpendicular to feet 80, 82 and 84 and extend through guide channels 110, 112 and 114 in rotating disk 58. Rotating disk 58 includes first and second inner spring posts 86, 88. Similarly, lower flange includes first and second spring posts 90, 92. Springs 94, 96 connect the first and second spring posts 86, 88 of the rotating disk 58 to the first and second spring post 90, 92 of the lower flange 16 respectively. Fastener 94 connects rotating disk 58 to stationary platform 70 for rotational engagement therewith.

Springs 94, 96 are configured to bias the rotating disk 58 such that first, second and third arms 20, 22 and 24 are oriented to extend radially toward the inner space 18 of body 12. The relationship between the rotating disk 58 and the respective guide posts 100, 102 and 104 allows movement of one arm to rotate the rotating disk 58 thereby influencing collective movement of all arms 20, 22 and 24.

As shown in FIGS. 3 and 4, arms 20, 22 and 24 are configured to actuate from a contracted first position (FIG. 4, radius A) to an expanded second position (FIG. 3, radius B). Upon insertion of a container into the holder, the container is influenced against first or (and) second arm(s) 20, 22 in an outboard direction toward upper flange 14. The movement of any arm 20, 22 or 24 in an outboard direction causes outboard movement of all arms 20, 22 and 24 creating an opening compatible with the outer circumference of the container. Once the container is suitably inserted into the holder 10 and is resting upon the stationary platform 70, springs 94, 96 bias arms 20, 22 and 24 inwardly against the container to provide retention. Since the arms 20, 22 and 24 adapt to translate inwardly and outwardly, the holder may accept a wide variety of containers having unique circumferences.

Figure 5:
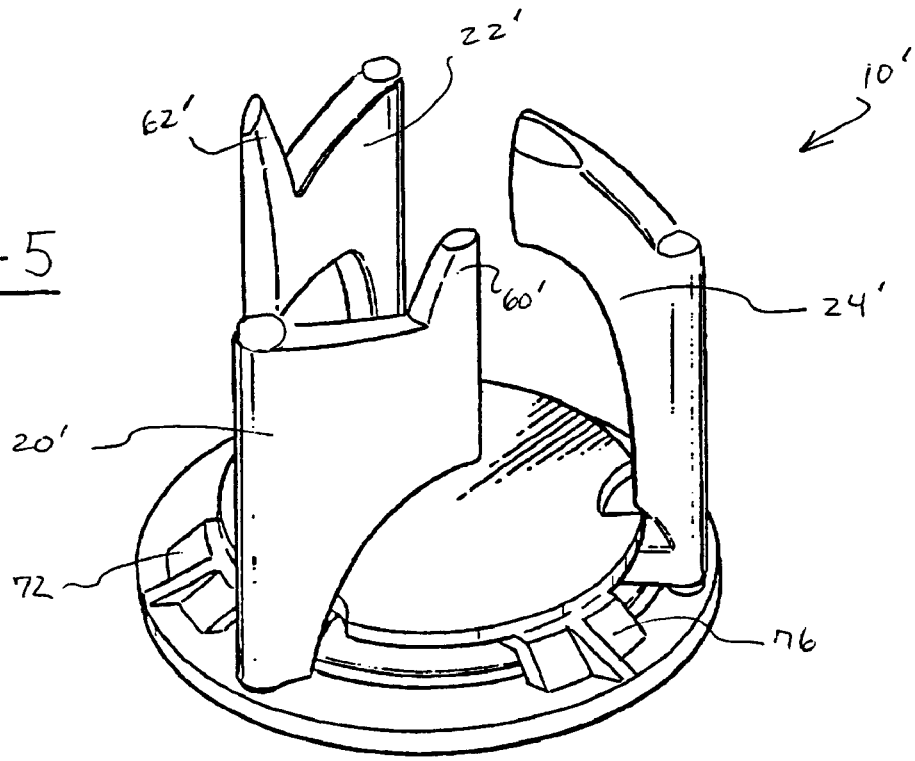
FIG. 5 is a perspective view of the cup holder according to a second embodiment of the present invention.
Figure 6:
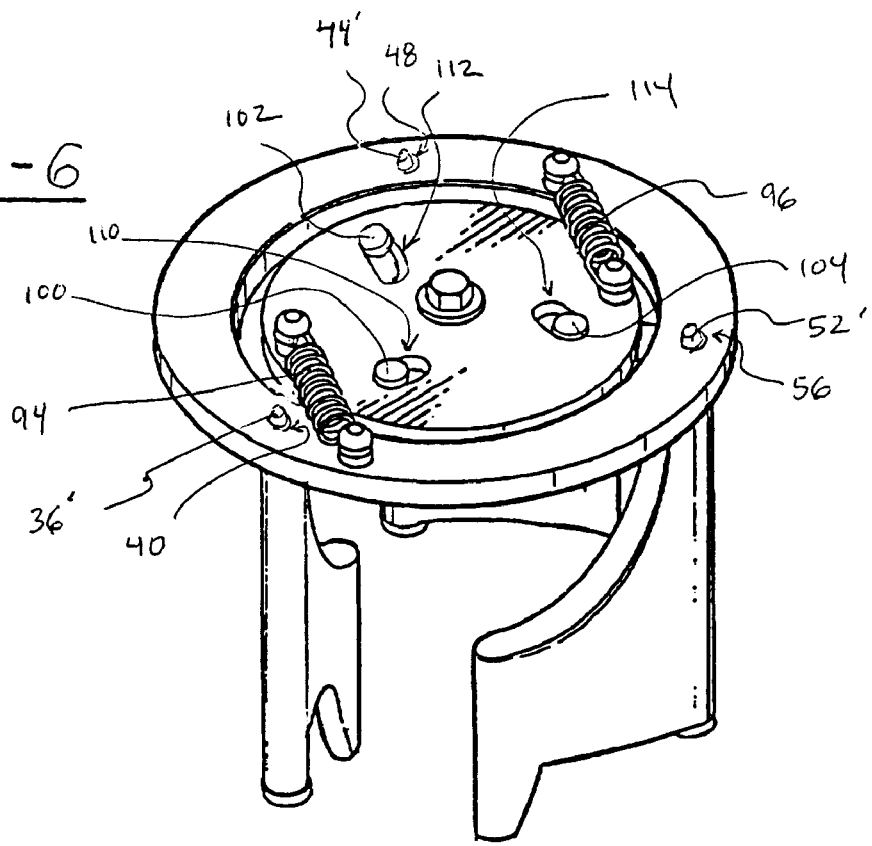
FIG. 6 is a perspective view of the second embodiment rotated upon a horizontal axis 180 degrees to illustrate the biased rotatable disk.

Turning now to FIGS. 5–7, the holder 10' according to a second embodiment is illustrated. Like components are referred to with like reference numerals. Holder 10' includes first, second and third arms 20', 22' and 24'. The second embodiment does not include cylindrical body 12 or upper flange 14. Because the fingers 60', 62' of arms 20' and 22' are not limited to expanding until contact with an upper flange 14, the arms 20', 22' and 24' may outwardly expand to a radius consistent with the mounting location of the arms (FIG. 7, radius C)

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holder for a container, the holder comprising:

a base with an area for supporting a container and a body with an open cylindrical end opposite the base and an upper and lower flange, the body defining an inner space;

a plurality of arms pivotally connected to the base and biased inwardly into the container supporting area, the arms including an outer portion and a contoured body portion, the outer portion is pivotally connected to the upper and lower flange; and a coupler assembly connecting the arms to the base, wherein the coupler assembly is arranged to facilitate pivotal movement of the arms for accepting containers of varying circumferences.

2. The holder according to claim 1, wherein one of the plurality of arms extends below the upper flange and the other of the plurality of arms include a stop member extending above the upper flange so as to limit the amount of pivot.

3. The holder according to claim 1, wherein the base further comprises a radially extending flange, and the plurality of arms are pivotally attached to the flange.

4. The holder according to claim 3, wherein the coupler comprises a rotatable member interconnected to the plurality of arms and the base, the rotatable member is arranged such that pivotal movement of any of the arms in a radially outward direction causes corresponding pivotal movement of all arms in an outward direction.

5. The holder according to claim 4, wherein the plurality of arms further include a plurality of guide posts and the rotating member further includes a plurality of grooves for slidably retaining the plurality of guide posts.

6. The holder according to claim 3, wherein the plurality of arms are biased radially inwardly toward a center of the radially extending flange.

7. The holder according to claim 3, wherein the arms include a vertical outer portion and a contoured body portion, and the vertical outer portion is pivotally connected to the radially extending flange.

8. The holder according to claim 3, wherein at least one of the plurality of arms includes an upwardly extending finger portion, the finger portion having a radial contour in an outward direction.

\* \* \* \* \*